United States Patent

[11] 3,600,072

| | | |
|---|---|---|
| [72] | Inventor | Lars-Erik Skagerlund, Karlskoga, Sweden |
| [21] | Appl. No. | 814,897 |
| [22] | Filed | Apr. 10, 1969 |
| [45] | Patented | Aug. 17, 1971 |
| [73] | Assignee | Aktiebolaget Bofors, Bofors, Sweden |
| [32] | Priority | Apr. 17, 1962 |
| [33] | | Sweden |
| [31] | | 5,145 |

[54] SENSITIVITY CONTROL DEVICE IN RECEIVERS FOR OPTICAL SIGNALS
2 Claims, 1 Drawing Fig.

[52] U.S. Cl. ........................................... 356/4, 5
[51] Int. Cl. ........................................... G01c 3/08
[50] Field of Search ................................... 356/4, 5; 250/207, 71.5

[56] References Cited

UNITED STATES PATENTS 3,516,751  6/1970  Fruengel.................. 356/4UXR

*Primary Examiner* — Rodney D. Bennett, Jr.
*Assistant Examiner* — J. M. Potenza
*Attorneys* — Hane and Baxley

ABSTRACT: A photomultiplier for generating electric pulses in response to impinging light has connected to its output a signal transmission device including threshold means so that pulses generated by the photomultiplier are passed through the transmission device only if their amplitude exceeds a threshold value. A pulse frequency detector is connected to the output of the transmission device to produce an output signal depending on the pulse repetition frequency of the pulses passed by the transmission device. This output signal is applied to control the relation between the threshold value and the amplitude of the pulses generated by the photomultiplier.

PATENTED AUG 17 1971

INVENTORS
MAX WASTL AND
BY RICHARD L. SHIRLEY

Darbo, Robertson & Vanderburgh
ATT'YS

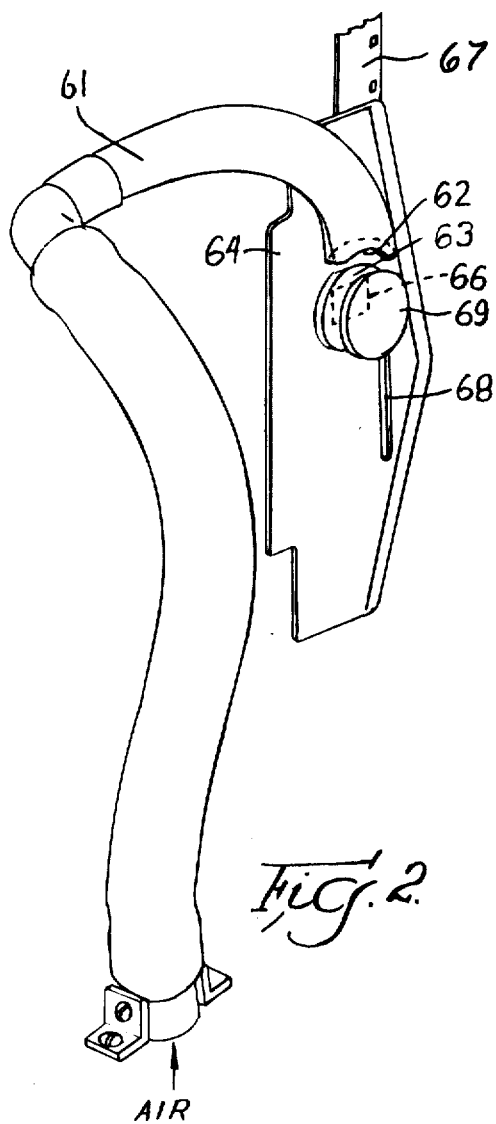

SENSITIVITY CONTROL DEVICE IN RECEIVERS FOR OPTICAL SIGNALS

BACKGROUND OF THE INVENTION

The invention relates to a device for sensitivity control in receivers for the reception of optical signals in the form of short pulses and particularly receivers for range finders operating with light pulses generated by a laser and comprising a photomultiplier tube which is arranged to receive the optical signals and to convert these signals into electric pulses and to amplify these pulses, and a signal transmission device, which is connected to the output of the photomultiplier and comprises a threshold device which permits transmission only of those signals whose amplitude exceeds a threshold value.

The current generated by a photomultiplier in response to impinging light of low intensity is not a continuous current but consists of discrete pulses of varying amplitude. This is also the case when the photomultiplier is subjected to a steady illumination of low intensity.

The optical system in a receiver for range finders operating with light pulses generated by a laser is so designed that the photomultiplier as far as possible is only actuated by the light pulses transmitted by the laser and reflected from some object. Therefore, the optical system has a very small field of view and it usually comprises a filter, e.g., an interference filter, which transmits only light having the wave length of the laser light. However, in spite of these precautions it is impossible to entirely prevent other light than the laser light from entering the optical system and impinging upon the photomultiplier. Also, the photomultiplier generates a certain "darkness current" even when it is not illuminated. Thus, in addition to the pulses generated by the laser light, in the following named echo pulses, pulses caused by light from the environment and the background and pulses corresponding to the darkness current of the photomultiplier are appearing at the output of the photomultiplier. These nondesirable pulses, in the following named noise pulses, are applied along with the echo pulses to the signal transmission device. Thus, there arises the problem of separating the echo pulses from the noise pulses and preventing the latter pulses from being forwarded by the signal transmission device to the counting means of the range finder.

The noise pulses have amplitudes varying at random, but the number of noise pulses appearing per unit of time whose amplitude exceeds a certain level is less the higher this level is. The signal transmission device connected to the photomultiplier can be provided with means, in the following named threshold means, which operate in such manner that only input signals having an amplitude exceeding a certain level, the threshold level, are transmitted. By making the threshold level sufficiently high it is possible to prevent a large portion of the noise pulses, i.e., those noise pulses whose amplitude exceeds the threshold level, from passing through the signal transmission device. Some noise pulses can be permitted to pass throught the signal transmission device, provided that the number of such pulses per time unit is small so that the probability of such a noise pulse appearing during the brief interval between the transmission and the reception of a laser pulse is small, for instance 1%. This can readily be achieved by making the threshold level sufficiently high.

However, the number of noise pulses appearing per time unit and having a large amplitude will vary considerably with the illumination conditions in the environment and the background of the range finder and the object, to which the distance is to be measured. If the threshold level is so chosen that the number of transmitted noise pulses becomes sufficiently small even under very unfavourable illumination conditions, this leads to the result that the range finder will have a small maximum range. The amplitude of the echo pulse must of course exceed the threshold level in order that is shall be passed through the signal transmission device, and since the amplitude of the echo pulse is less the longer the distance it has travelled, echo pulses from objects situated at large distances will not have a sufficiently large amplitude upon reception to exceed the threshold. Thus, the threshold level determines the maximum range of the range finder. A threshold level which has been chosen with regard to the worst possible illumination conditions is unnecessarily high at better illumination conditions, i.e., such illumination conditions which cause a smaller number of noise pulses having a large amplitude. As a consequence the maximum range of the range finder under better illumination conditions will be unnecessarily limited, since the threshold value could then be lower so that even weaker echo pulses could pass through the signal transmission device.

It is an object of the present invention to eliminate this drawback and to provide a sensitivity control so that the threshold level is automatically adapted to the illumination conditions.

SUMMARY OF THE INVENTION

In accordance with the invention a receiving system of the kind described above comprises pulse frequency detecting means for producing an output signal depending on the pulse repetition frequency of the pulses passed by the signal transmission means, and means for applying said output signal to control the relation between said threshold value and the amplitude of the puses emanating from the photomultiplier.

In a preferred embodiment of the invention the output signal from the pulse frequency detecting means is applied to a comparison device which also receives a reference signal from a signal source producing a reference signal corresponding to a predetermined pulse repetition frequency. The comparison device produces an output signal representing the difference between the output signal from the pulse frequency detecting means and the reference signal. This difference signal is used to control the relation between the threshold value and the amplitude of the pulses emanating from the photomultiplier.

If, as is usually the case, the signal transmission device connected to the output of the photomultiplier includes an amplifier, the threshold means is preferably included in the amplifier. In such case the pulse frequency detector is preferably connected to the output of the amplifier, and the control means are arranged to control the threshold value under the control of the output signal from the pulse frequency detector or the comparison device.

However, in some cases the amplification effected by the photomultiplier may be so large that an amplifier can be dispensed with in the signal transmission device. In such case it may be preferable to let the threshold means have a constant threshold value and to control the relation between the threshold value and the amplitude of the pulses emanating from the photomultiplier by making the output signal of the pulse frequency detector or the comparison device actuate the control means for controlling a feed voltage for the photomultiplier thereby controlling the amplitude of the outgoing pulses.

The reference signal from the reference signal source is controlled so that it corresponds to a pulse repetition frequency which makes the probability of a noise pulse appearing during the time interval between the transmission and reception of the laser pulse sufficiently small. The output signal from the pulse frequency detector or the comparison device acts upon the control means for the threshold value in such manner that if the pulse repetition frequency as detected by the pulse frequency detector becomes too large, the threshold value is increased and vice versa.

DETAILED DESCRIPTION

Figure 1:
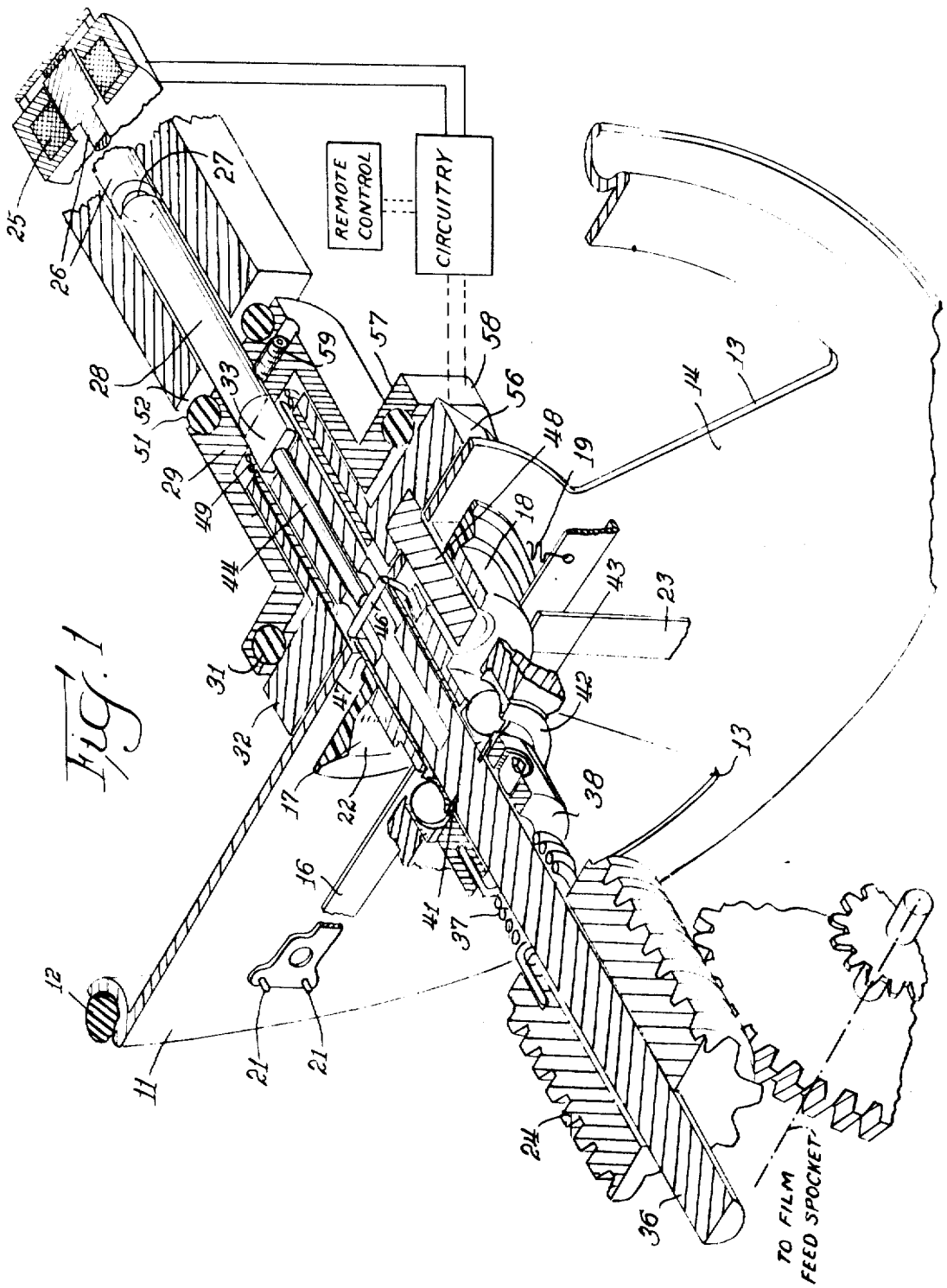

In the following the invention will be described more in particular with reference to the accompanying drawing which shows a block diagram of a device in accordance with the invention.

In the drawing 1 designates a photomultiplier tube which is included in known manner in the optical system of the receiver so that its photo cathode is hit by the light entering through the optical system. This light is indicated in the drawing by arrows at the lefthand side of the photomultiplier 1. The output of the photomultiplier is connected to an amplifier 2 which is so designed that only input signals having an amplitude exceeding a certain threshold value are amplified and passed to the output of the amplifier. The signals appearing at the output of amplifier 2 are transmitted over a line 3 to utilization means (not shown), e.g., to means for measuring the time interval between the transmission and the reception of a laser pulse.

To the output of amplifier 2 is also connected a pulse frequency detector 4 of known kind which produces an output signal, e.g., a direct voltage, whose intensity varies with the pulse repetition frequency. The output signal from the pulse frequency detector is applied to a comparison device 5. This comparison device also receives a reference signal, e.g., a direct voltage, from a reference signal source 6. The comparison device 5 generates an output signal depending on the difference between the signals supplied from the devices 4 and 6. This output signal is transmitted over line 7 to the control means for controlling the threshold value of the amplifier.

The various parts represented by blocks in the drawing may each be designed in known manner, and therefore they will not be described in detail. The control means for controlling the threshold value of the amplifier may for instance consist of a rectifier which is given a certain bias which must be exceeded by the signal voltage in order that an output voltage shall be produced. Preferably the rectifier has a fixed bias on which the output voltage from the comparison device 5 is superposed. The reference signal source 6 is preferably so designed that the reference signal can easily be adjusted to any desired value.

Alternatively the output of the comparison device 5 may be connected to control means for controlling the feed voltages of the electrodes of the photomultiplier. Such a connection is indicated in the drawing by the dotted line 8. The voltage feed equipment and the associated control means can be designed in known manner, and therefore they have been indicated only in the form of a block 9 in the drawing.

I claim:

1. A device for sensitivity control in receivers for receiving optical signals in the form of short pulses, particularly receivers for range finder systems operating with light pulses generated by a laser, said receiver comprising a photomultiplier for receiving the optical signals, converting these signals into electric pulses and amplifying these pulses, and signal transmission means connected to the output of said photomultiplier, said signal transmission means comprising threshold means permitting the transmission only of signals whose amplitude exceeds a threshold value, characterized by pulse frequency detecting means for producing an output signal depending on the pulse repetition frequency of the pulses passed by said signal transmission means, and means for applying the output signal from said pulse frequency detecting means to control a supply voltage for said photomultiplier thereby controlling the amplitude of the pulses generated by said photomultiplier and accordingly the relation between said threshold value and the amplitude of the pulses emanating from said photomultiplier.

2. A device for sensitivity control in receivers for receiving optical signals in the form of short pulses, particularly receivers for range finder systems operating with light pulses generated by a laser, said receiver comprising a photomultiplier for receiving the optical signals, converting these signals into electric pulses and amplifying these pulses, and signal transmission means connected to the output of said photomultiplier, said signal transmission means comprising an amplifier including threshold means permitting the transmission only of signals whose amplitude exceeds a threshold value, characterized by pulse frequency detecting means connected to the output of said amplifier for producing an output signal depending on the pulse repetition frequency of the pulses passed by said signal transmission means, and control means responsive to the output signal from said pulse frequency detecting means for applying said output signal to said threshold means to control the relation between said threshold value and the amplitude of the pulses emanating from the photomultiplier.